2,929,358
RECEPTACLE FOR AN ANIMAL LEASH

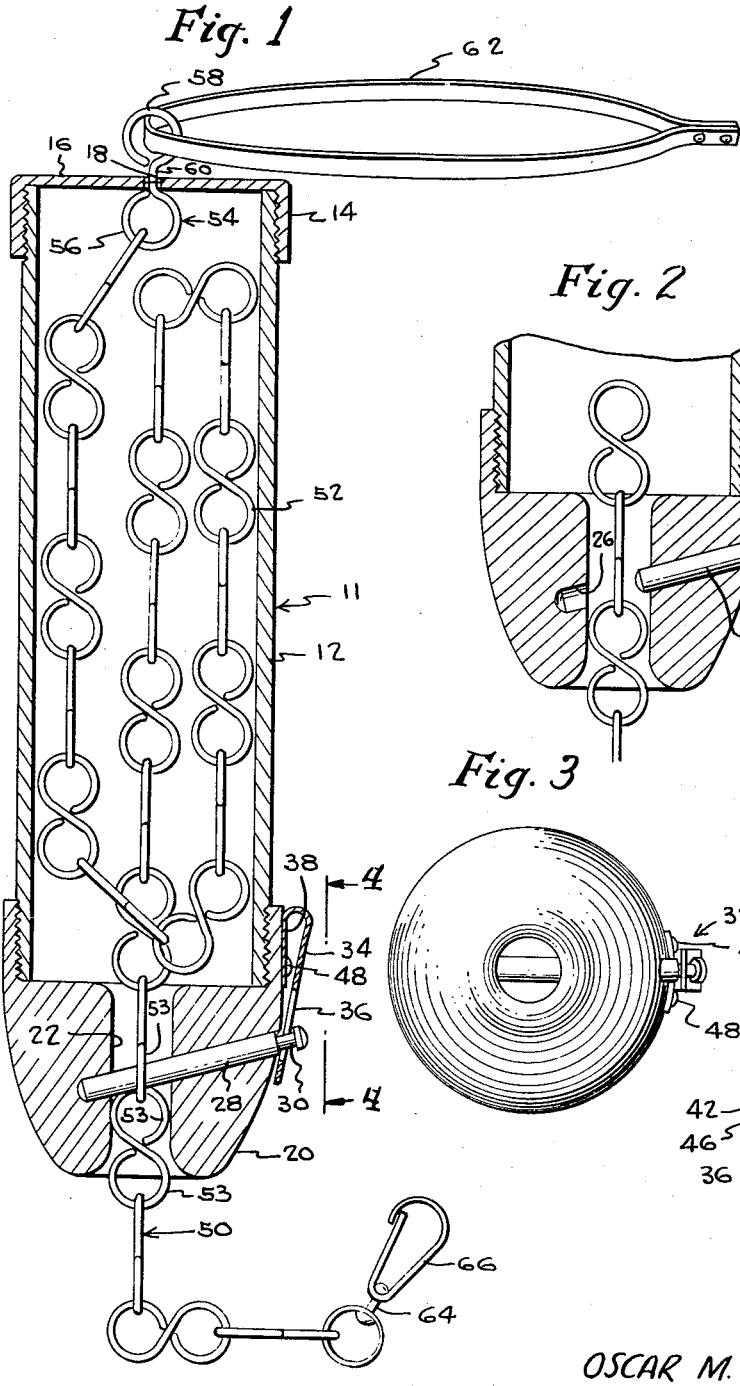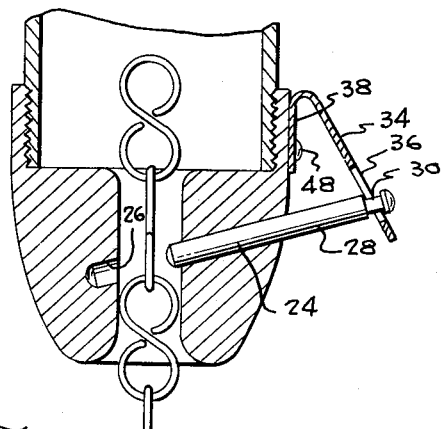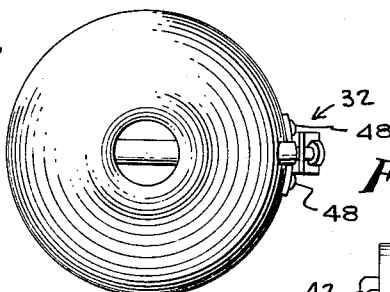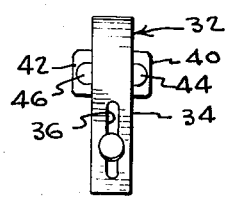
March 22, 1960 — O. M. MORROW — 2,929,358
RECEPTACLE FOR AN ANIMAL LEASH
Filed Dec. 6, 1957
INVENTOR.
OSCAR M. MORROW
BY McMorrow, Berman & Davidson
ATTORNEYS

Oscar M. Morrow, Canton, Ohio

Application December 6, 1957, Serial No. 701,191

1 Claim. (Cl. 119—109)

This invention relates to a receptacle for animal leashes and, more specifically, the invention pertains to a receptacle for animal leashes wherein the leash may be payed out from the receptacle to a desired length, together with means for locking the leach against inadvertent or accidental additional extension.

One of the primary objects of this invention is to provide a receptacle for chain type animal leashes, the receptacle having means mounted for reciprocation thereon to prevent accidental or inadvertent withdrawal of the chain from the receptacle.

This invention contemplates, as a further object thereof, the provision of a receptacle of the type generally described supra, the receptacle being non-complex in construction and assembly, inexpensive to manufacture, and durable in use.

Other and further objects and advantages of the present invention will become more evident from a consideration of the following specification when read in conjunction with the annexed drawing, in which:

Figure 1 is an enlarged vertical cross-sectional view of the receptacle and animal leash constructed in accordance with this invention and showing the retaining means in its operative position;

Figure 2 is a fragmentary detail cross-sectional view similar to Figure 1, but showing the retaining means in its inoperative position;

Figure 3 is a bottom plan view of the receptacle shown in Figure 1; and

Figure 4 is a side elevational view of the retaining means taken substantially on the vertical plane of Figure 1, looking in the direction of the arrows.

Referring now more specifically to the drawings, reference numeral 10 designates, in general, a receptacle for an animal leash constructed in accordance with the teachings of this invention. As illustrated in the several figures, the device 10 is seen to include an elongated, substantially hollow, cylindrical main body portion 12, having a pair of opposed open ends. One of the open ends of the main body portion 12 is provided with a substantially cylindrical closure cap 14 threadedly mounted thereon and having an end wall 16 extending thereacross. The end wall 16 is provided with a substantially centrally located aperture 18 to serve a function to be described below.

A plug 20 having a substantially ogive configuration extends across and is threadedly secured to the main body portion 12 adjacent its other open end. The plug 20 is provided with an elongated substantially hollow circular passageway 22 co-axially aligned with the main body portion 12. Referring now more specifically to Figure 2, it is seen that the plug 20, intermediate its inner and outer ends is provided with a transversely extending bore 24 angularly inclined with respect to the longitudinal axis of the passageway 22 and opens at its inner end thereinto. The plug 20 is also provided with a socket 26 co-axially aligned with the bore 24 and opening at its inner end into the passageway 22.

As is seen in Figure 1, an elongated cylindrical locking member 28 is mounted for reciprocation in the bore 24 and the socket 26. In its operative position the inner end of the locking member extends across the bore 22 and occupies the socket 26. The inoperative position of the locking member 28 is illustrated in Figure 2, wherein the inner end of the locking member has been withdrawn from the socket 26 and substantially clears the passageway 22.

The outer end of the locking member 28 projects beyond the outer side of the plug 20 and is provided with a reduced neck portion 30 to serve a function to be described below.

Resilient means 32 is provided to constantly bias the locking member 28 in its locked position, the means 32 having an inverted substantially L-shaped configuration including an elongated leg member 34 having an elongated longitudinally extending slot 36 formed therein adjacent the outer end thereof. The foot portion 38 of the resilient means 32 is provided with a pair of laterally projecting flanges 40, 42 apertured at 44, 46, respectively. Screws 48 or other conventional securing means extend through the apertures 44, 46 and penetrate the upper end of the plug 20 to fixedly connect the resilient means 32 thereto with the lower end of the leg member 34 disposed adjacent the outer end of the locking member 28. The construction is such that the outer end of the locking member 28 passes through the slot 36 to position the reduced neck portion 30 for reciprocation therein, and whereby the locking member 28 is constantly biased for movement in a direction of the socket 26.

Reference numeral 50 connotes, in general, an animal leash which comprises a chain 52 including a plurality of links having a figure 8 configuration including eyes 53 and a link 54 having a pair of eyes 56, 58 interconnected by a shank 60. As is seen in Figure 1, the eye 56 is disposed within the receptacle 10 adjacent the cap 14 with the shank 60 extending through the aperture 18 and with the eye 58 disposed immediately adjacent the end wall 16 on the exterior side of the cap 14. An endless hand strap 62 is threaded through the eye 58 to afford handle means.

Swivel means 64 connect a conventional snap hook 66 to the other terminal end of the chain 52 for detachable connection to an animal collar or harness.

Figure 1 illustrates the device 10 in its operative position. Under this condition the locking member 28 is seen to extend through one of the eyes 53 of the chain 50 with the inner end thereof disposed within the socket 26. This effectively prevents further paying out of the chain 52 beyond the number of links illustrated. Upon connection of the snap hook 66 with an animal collar or harness, the operator releases the chain 50 by pulling outwardly on the leg portion 34 thereby pulling the locking member 28 from the socket 26 and releases the eye 53 engaged thereby, the locking member 28 moving to substantially clear the passageway 22. The chain 50 now being released may be withdrawn from the receptacle 10 to any desired length after which the operator releases the leg portion 34 so that the tension thereof on the locking member 28 moves the locking member 28 in the opposite direction to effect re-engagement thereof with another one of the eyes 53 of the chain and re-insertion of the inner end of the locking member 28 within the socket 26.

Having described and illustrated one embodiment of this invention in detail, it will be understood that the same is offered merely by way of example, and that this invention is to be limited only by the scope of the appended claim.

What is claimed is:

A receptacle for an animal leash comprising an elongated, substantially hollow cylindrical main body portion, said main body having a pair of opposed open ends, a closure cap threadedly secured on and over and extending across one of said open ends and having a substantially centrally located aperture extending transversely therethrough, said main body portion having a substantially ogive plug affixed to and extending across the other end thereof, said plug having an axially extending passageway therethrough, said plug having a transversely extending bore partially extending therethrough and communicating at its inner end with said passageway, said plug having a socket in coaxial alignment with said bore, an elongated substantially cylindrical locking member mounted for reciprocation in said bore and said socket and normally extending across said passageway, resilient means to bias constantly said locking member in the direction of the socket, said means comprising an elongated leg member having an elongated longitudinally extending slot formed therein, a foot member secured to said ogive plug, a reduced neck portion on the outer end of said locking member slidably engaged in said slot in said leg member, a perforate animal leash contained within said main body portion, said leash having a terminal end passing through and fixedly secured to said closure cap and connected with an endless strap handle, the other terminal end of said leash extending through said passageway for connection with snap fastener means, said locking member normally extending through one of said perforations to prevent withdrawal of said leash beyond a selected length thereof, and said leg member of said locking means causing said locking member to be selectively engageable in said perforations of said leash.

References Cited in the file of this patent
UNITED STATES PATENTS

| | | |
|---|---|---|
| 642,567 | Arsneau | Feb. 6, 1900 |
| 745,808 | Fair et al. | Dec. 1, 1903 |
| 757,882 | Butterworth | Apr. 19, 1904 |
| 1,199,151 | Brobst | Sept. 26, 1916 |
| 2,275,701 | Taylor | Mar. 10, 1942 |
| 2,337,970 | Cassell | Dec. 28, 1943 |
| 2,776,644 | Fontaine | Jan. 8, 1957 |